United States Patent [19]
Van Etten et al.

[11] Patent Number: 5,657,022
[45] Date of Patent: Aug. 12, 1997

[54] UNAMBIGUOUS RANGE-DOPPLER PROCESSING METHOD AND SYSTEM

[75] Inventors: Paul Van Etten, Clinton; Michael C. Wicks, Utica, both of N.Y.

[73] Assignee: The United States of America as represented by the Secretary of the Air Force, Washington, D.C.

[21] Appl. No.: 985,071

[22] Filed: Nov. 17, 1992

[51] Int. Cl.⁶ .................................................. G01S 13/50
[52] U.S. Cl. .................... 342/104; 342/107; 342/115; 342/132; 342/134; 342/137; 342/145
[58] Field of Search ........................... 342/104, 13, 107, 342/112, 115, 132, 134, 137, 145, 201, 203

[56] References Cited

U.S. PATENT DOCUMENTS

| | | | |
|---|---|---|---|
| 3,378,838 | 4/1968 | Romano | 342/104 |
| 3,500,400 | 3/1970 | Woerrlein | 342/104 |
| 3,883,871 | 5/1975 | Moore | 342/201 |
| 3,969,725 | 7/1976 | Couvillon et al. | 342/47 |
| 4,096,478 | 6/1978 | Chaves | 342/132 |
| 4,568,939 | 2/1986 | Grau | 342/104 |
| 4,602,258 | 7/1986 | Sarfati | 342/135 |
| 4,689,627 | 8/1987 | Lee et al. | 342/373 |
| 5,361,072 | 11/1994 | Barrick et al. | 342/133 |
| 5,422,646 | 6/1995 | Lewis | 342/160 |

*Primary Examiner*—John B. Sotomayor
*Attorney, Agent, or Firm*—William G. Auton

[57] ABSTRACT

Range-Doppler ambiguity is eliminated from an ultra-wideband radar system by transmitting an ultra-wideband chirped pulse towards a moving target, and mixing it with the doppler-shifted chirped pulse which is received as a target echo return signal. Multioctave radar tracing systems can potentiality track stealth aircraft without ambiguity since pulses containing many frequencies can defeat narrow-band radar absorbing material coatings. The unambiguous range-doppler signal processing method mixes the chirped pulse to yield an instantaneous Doppler frequency (which indicates target velocity) and a rate of change in the instantaneous Doppler frequency (which indicates target acceleration).

17 Claims, 7 Drawing Sheets

SIMPLIFIED BLOCK DIAGRAM OF A FM-CW RADAR WITH A DOPPLER FILTER BANK

INSTANTANEOUS FREQUENCY VS. TIME DIAGRAM

SPECTRUM OF TARGET'S BEAT NOTE FROM MIXER OUTPUT

RANGE-DOPPLER FREQUENCY AMBIGUITY CONTOUR FOR A LINEAR FM WAVE FORM

MIXER BEAT NOTE FOR A MOVING TARGET AT ZERO RANGE

INSTANTANEOUS FREQUENCY VS. TIME FOR THREE TARGETS WITH VELOCITIES OF 0, 100 & 400 KNOTS, ALL AT ZERO RANGE

SPECTRUM OF THE SAME THREE TARGETS OF FIGURE 5

INSTANTANEOUS FREQUENCY VS. TIME

SIMPLIFIED BLOCK DIAGRAM OF A FM-CW RADAR WITH A DOPPLER CHIRP COMPRESSION FILTER TUNED TO THE CORRESPONDING 100 KNOT TARGET

WAVEFORMS AT VARIOUS LOCATIONS IN THE SYSTEM IN FIGURE 8

RESPONCE OF CHIRP COMPRESSION FILTER SHOWING THE
EFFECT OF DOPPLER FREQUENCY OFFSET

UNAMBIGUOUS RANGE-DOPPLER PROCESSING METHOD AND SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar tracking systems, and more specifically the invention pertains to a waveform and signal processing technique that eliminates troublesome Range-Doppler ambiguities. This is brought about by radiating a large bandwidth, long time duration waveform. Of considerable importance is that the method and system employs a matched filter receiver for an optimum Signal-to-Noise Ratio. Time expansion correlation is used in the receiver to reduce the bandwidth to allow signal and data processing with present day analog and/or digital components.

Multioctave bandwidth radar systems present some advantages which are valuable for use with emerging stealth technology. More specifically, a radar system that can meet its search and track requirements while remaining undetected by the enemy, will be less vulnerable to attack. This waveform design has many additional advantages over conventional waveforms. This large bandwidth (high resolution) waveform is ideally suited for target identification applications. This waveform provides anti-jamming features and naturally provides for clutter suppression. Also, this waveform is ideally suited to stealth aircraft onboard radar applications. This technology can also be applied to sonar system as well as radar.

Ultra-wideband (UWB) radar systems are subject to a number of inherent problems which need resolution. Range-Doppler ambiguities are a potential problem for all radar systems, but present a particular problem to UWB systems as described below.

When a radar target is illuminated with a continuous wave (CW) electromagnetic single frequency waveform, the reflected energy is shifted in frequency in proportion to the target's velocity (V) and inversely as the carrier's wavelength (C/f), where f is the carrier frequency. The shift in frequency $f_d$, is called the Doppler frequency. If a single, narrow frequency is used, the shift in frequency provides an indication of the movement of the target with respect to the radar receiver tracking the target. If a multioctave, wideband radar system is used, the frequency of the target echo return signal might not be perceived as a shifted frequency. More specifically, the shifted frequency of the echo return of a moving target can be close to one of the transmitted frequencies of the wideband radar transmitter, and therefore there exists an ambiguity in the Range-Doppler frequency of the return signal.

Another source of ambiguity is the "velocity walk" phenomenon of the radar return signals of accelerating targets. The velocity of an accelerating target changes over an interval of time. Therefore the frequency of the target echo return signal is not only shifted, but has both a shifted frequency and a frequency that is changing in real time. Uncompensated velocity walk phenomena produce a "smearing" of the Doppler offset over the coherent processing interval and are an additional source of ambiguity.

The task of resolving the Range-Doppler frequency ambiguities experienced by ultra-high wideband radar tracking systems is alleviated, to some extent by the systems disclosed in the following U.S. Patents, the disclosures of which are incorporated herein by reference;

U.S. Pat. No. 3,378,838 issued to Romano;
U.S. Pat. No. 3,500,400 issued to Woerrlein
U.S. Pat. No. 3,969,725 issued to Couvillon et al.,
U.S. Pat. No. 4,096,478 issued to Chavez,
U.S. Pat. No. 4,568,939 issued to Grau; and
U.S. Pat. No. 4,689,627 issued to Lee et al.

The Couvillon U.S. Pat. No. 3,969,725 for improved distance measuring equipment consist of an airborne linear chirp (LFM) interrogator transmitter, and a correlating (or matched filter) receiver at a fixed ground station. A LFM pulse burst pair (two pulses) is transmitted, in one of four combinations, up ramp/up ramp, up ramp/down ramp, down ramp/up ramp, or down ramp/down ramp, to reduce range-doppler ambiguities. The pulse burst waveform is received at the ground station, and decoded. A conventional pulse gated RF burst pair is reradiated by the transponder, received by the airborne unit, processed and distance information is produced the Convillon.

The Lee et al. patent disclolses an ultra-wideband radar system.

The Chavex patent employs a chirped pulse pair for eliminating or reducing range ambiguties, in a fashion very similar to the Couvillon patent.

The Romano U.S. Pat. No. 3,378,838 and Woerrlein U.S. Pat. No. 3,500,400 patent employ pulse burst pairs in the elimination of Range-Doppler ambiguities, where pulse to pulse frequency hopping (within a pulse burst) is utilized to provide an additional signal processing discriminant, (to reduce ambiguities). As in the Couvillon and Chavez patents, multiple pulse processing is required to resolve ambiguities, in stark contrast to the subject invention.

While the above-cited references are instructive, the need remains to provide an unambiguous Range-Doppler radar processing system. The present invention is intended to satisfy that need.

SUMMARY OF THE INVENTION

The present invention includes a radar tracking process and system for obtaining an unambiguous Range-Doppler measurement of a target velocity while using ultra-wideband frequencies.

The three steps of the process described below entail: (1) transmit an ultra-wideband chirped pulse from a radar system; (2) receive a Doppler-shifted chirped pulse as a target echo return signal; and (3) calculate an unambigious estimate of the target velocity therefrom as As mentioned in an article of Aviation Week and Space Technology by William Scott on 4 Dec. 1989, UWB radar has potential to detect stealth aircraft. Mr. Scott describes the use of a 200 picosecond wideband impulse which contains many frequencies to capture a radar image of a B1 bomber. Unfortunately multioctave bandwidth impulses have inherent Range-Doppler ambiguity characteristic in their return signals. A moving target will reflect a target echo return signal which has a Doppler shift in the frequency.

When a multioctave pulse is transmitted, the question may arise; "from which tansmitted frequency is the echo shifted from?" The present invention includes a process for resolving Range-Doppler ambiguities in ultra-wideband radar tracking systems. The process begins by the transmission of a chirped pulse pair with frequencies $f_1$ and $f_2$ selected from an ultra wideband portion of the radar frequency spectrum. Typical radar frequencies range from 300 Mc to about 40 Gc. Next, a Doppler shifted chirp pair $f_d1$ and $f_d2$ are received as target echo return signals from a moving target. Finally an estimate of the actual target velocity V is determined from the mathematical relationship given by:

$$b = f_{d2} - f_{d1} = 4VB/C \text{ where:}$$

$B = f_2 - F_1 =$ origional bandwidth;

$C =$ the speed of light;

$V =$ the target velocity; and $b =$ the bandwidth of the Doppler shifted chirp pair.

The unambiguious estimate of the target velocity V is determined by the change in bandwidth between a transmitted chirped pulse pair and that of the received Doppler shifted chirp pair. The velocity is given by:

$$V = C(f_{d2} - f_{d1})/4B$$

A related approach entails the determination of the instantaneous Doppler frequency, and the rate of change of instantaneous doppler frequency in an UWB Linear Frequency Modulated (LFM) radar system. Even for a constant velocity target, Doppler frequency is time varying.

In this embodiment of the proces we use:

$$f_i = 2RB/CT + 2Vt/CT;$$

and $$df_i/dt = 4VB/CT$$

The second equation presented above applies only for the special case of a target moving at constant velocity, while the first equation is more general. For the case of an accelerating target, an additional term would arise, and the resulting equation would be:

$$df_i/dt = 4VB/CT + 2ABt/CT,$$

where A is an acceleration term, i.e.

$$A = dV/dt$$

Using these equations the subject invention can now be easily expanded to include Doppler deramping chirp waveforms which are tuned to accelerating target returns. With minor modifications, the subject invention is also applicable to other (non-linear) UWB Frequency Modulated waveforms.

The signal processing method described above can be implemented using the ultra-wideband radar system of the above-cited Lee et al. reference. This is accomplished by using the equations in a digital data processor. Another embodiment of present invention includes an FM-CW radar with a Doppler chirp compression filter. This radar system includes: a chirp pulse generator, a transmitting radar antenna, a radar receiving antenna, two mixers, a doppler deramping chirp signal generator, an amplitude weighting amplifier and a spectrum analyzer.

The chirp pulse generator is a waveform generator that produces an ultra-wideband chirp pulse, which radiated out through the transmitting antenna to the target. A Doppler-shifted chirp pulse is reflected off the target and received by the receiving antenna.

It is the object of the present invention to provide a data analysis process for obtaining unambiguous Range-Doppler radar measurements of moving targets.

It is the object of the present invention to provide an ultra-wideband radar system which resolves the Range-Doppler ambiguity.

These together with other objects, features and advantages of the invention will become more readily apparent from the following detailed description when taken in conjunction the accompanying drawings wherein like elements are given like reference numerals throughout.

DETAILED DESCRIPTION OF THE PREFERRED EMBODIMENT

The present invention includes an unambiguous Range-Doppler system which eliminates Range Doppler ambiguities using ultra wideband frequencies.

As mentioned above, when a radar target is illuminated with a continuous wave (CW) electromagnetic single frequency waveform, the reflected energy is shifted in frequency proportional to the target's velocity (V) and inversely as the carrier's wavelength (C/f), where f is the carrier frequency. The shift in frequency, $f_d$ is called the doppler frequency, and is given by:

$$f_d = 2Vf/C$$

Some examples are given in Table 1 below.

TABLE 1

DOPPLER FREQUENCIES VS. CARRIER FREQUENCY & TARGET VELOCITY (U)

| | DOPPLER FREQUENCY | |
|---|---|---|
| CARRIER FREQUENCY | TARGET VELOCITY 100 KNOTS | TARGET VELOCITY 400 KNOTS |
| 1 GHz | 340 Hz | 1.36 KHz |
| 2 GHz | 680 Hz | 2.72 KHz |
| 4 GHz | 1.36 KHz | 5.44 KHz |
| 8 GHz | 2.72 KHz | 10.88 KHz |
| 12 GHz | 4.08 KHz | 16.32 KHz |

EXAMPLE

Figure 1:
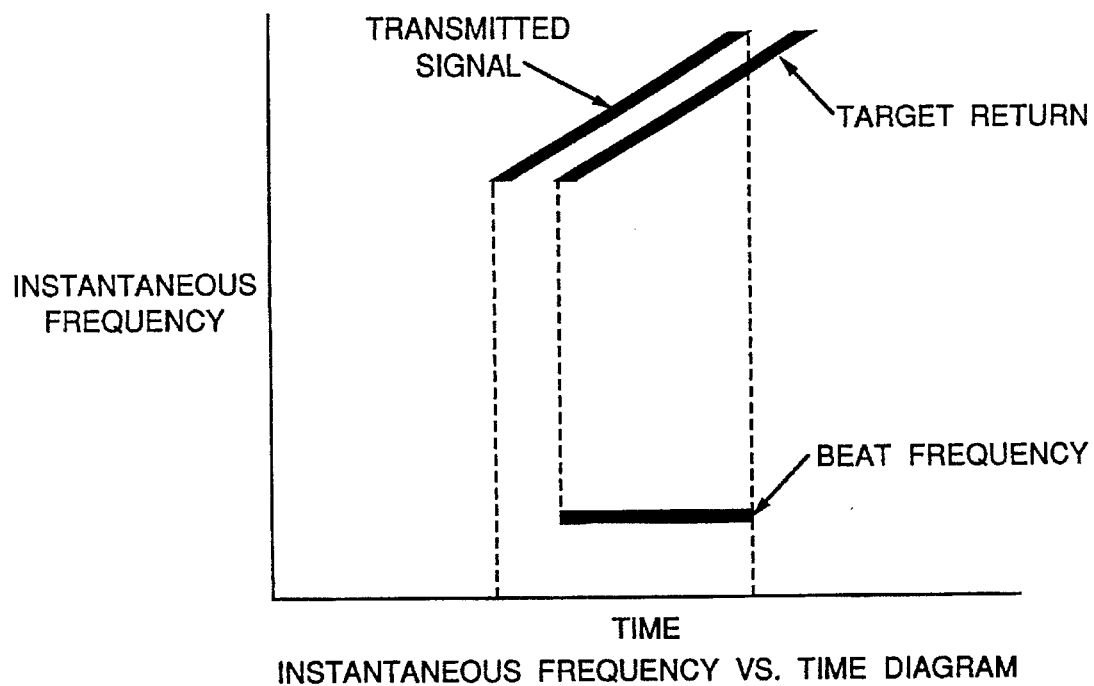
FIG. 1 is a chart displaying instantaneous freqency vs. time.

Consider a FMCW radar system radiating a linear frequency modulated waveform where the target return is mixed with the transmitted waveform to obtain a constant beat frequency as seen in FIG. 1. The frequency of the beat note, $f_o$, is:

$$f_o = Nt_o \quad (2)$$

where:

N=The slope of the transmitted waveform in Hertz per second $t_o$=The time delay of the target return in seconds.

By performing a Fourier Transform of the mixer output, the center frequency of the beat note becomes the range to the target.

Using:

$$R = \tfrac{1}{2} C\, t_o \quad (3)$$

where

C=Velocity of light
R=Target Range or:

$$t_o = 2R/C \quad (4)$$

which gives:

$$f_o = 2NR/C \quad (5)$$

Noting that the slope of the transmitted waveform is:

$$N = B/T \quad (6)$$

where:

B=Bandwidth of the transmitted signal, and
T=Time duration of transmitted signal.

The beat note becomes:

$$f_o = 2BR/CT \quad (7)$$

Figure 2:
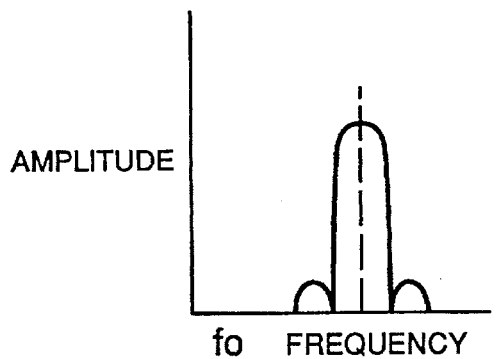
FIG. 2 is a chart displaying the spectrum of a target's beat note from the output of the first mixer of FIG. 8.

Its spectrum is seen in FIG. 2.

The range resolution, delta R, for linear modulation is:

$$\text{delta } R = C/2B \quad (8)$$

Figure 3:
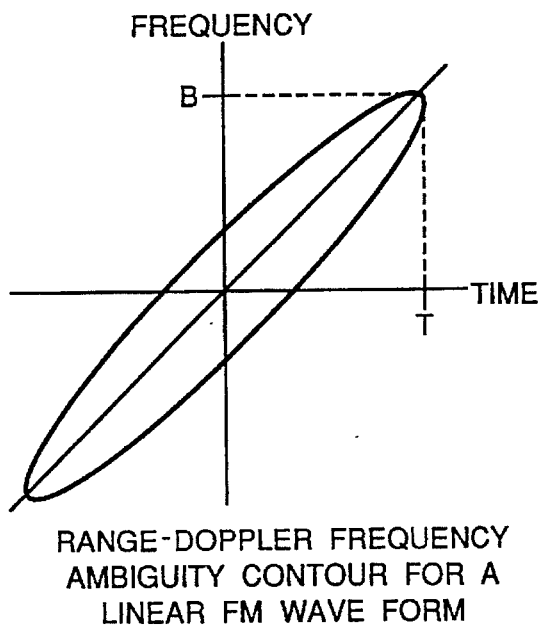
FIG. 3 is a chart displaying the range dopler frequency ambiguity contour for a linear FM waveform.

Now consider the case when the target is moving. The doppler frequency offset of the moving target return will also appear on the beat note and the target now appears at the wrong range. This error is called the range-doppler ambiguity. The range-doppler frequency ambiguity for LFM waveform is shown in FIG. 3.

For radar systems with long transmitted waveforms, this Range-Doppler ambiguity can be troublesome. In the above discussion the system was considered to be narrow band and served as an introduction to the wideband system now to be considered.

Conventional radar technology implies systems utilizing waveforms with modulation bandwidths of up to 2%, while modern wideband radar systems utilize bandwidths of less than 25%. Present research and development efforts involve expanding bandwidths into ultra-widebands as follows.

Typical radar systems transmit waveforms with frequencies selected from those presented below in table 2.

TABLE 2

| Radar frequency band | Frequency |
|---|---|
| UHF | 300–1,000 Mc |
| L | 1,000–2,000 Mc |
| S | 2,000–4,000 Mc |
| C | 4,000–8,000 Mc |
| X | 8,000–12,500 Mc |
| K | 12.5–18 Gc |
| K | 18–26.5 Gc |
| K | 26.5–40 Gc |
| Millimeter | >40 Gc |

In most cases the radar systems use a single band. That is, the system operates on only one frequency band. Thus, two (or more) array apertures are required in order to process multiple frequencies. In the past, this has caused the multifrequency systems to have multiple apertures with the attendant increases in cost, weight, size and the like. These prior art systems have had disadvantages.

The above-cited Lee et al. reference discloses an ultra-wideband radar system which can operate over approximately an octave bandwidth encompassing, for example, both S-band and C-band. The present invention can make use of the Lee et al. system to transmit mutioctave chirp pairs in a process which eliminates Range Doppler ambiguities.

Figure 4:
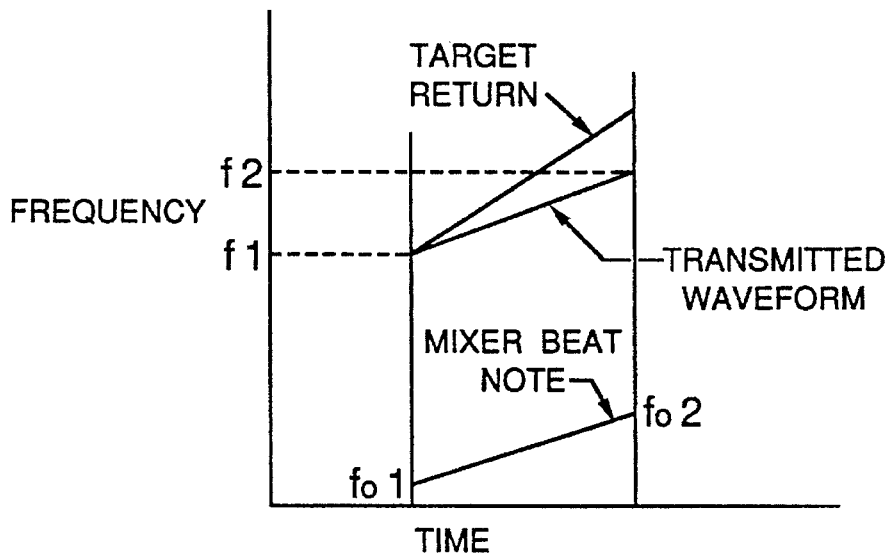
FIG. 4 is a chart displaying the mixer beat note for a moving target at zero range.

For wideband (i.e. multioctave bandwidth) waveforms, the spectrum of the target return will have a different Doppler shift as a function of frequency. When the transmitted waveform chirps from $f_1$ to $f_2$, the doppler frequency chirps from $f_{d1}$ to $f_{d2}$. This is called the doppler chirped waveform and has a bandwidth of b, (see FIG. 4):

$$b = f_{d2} - f_{d1} \quad (9)$$

$$fd_1 = 2Vf_1/C + 2BR_1/TC$$

$$fd_2 = 2Vf_2/C = 2Br_2/TC$$

$$b = 2V(f_2 - f_1)/C + 2B(R_2 - R_1)/TC \quad (10)$$

let:

$$B = f_2 - f_1 \quad (11)$$

$$V = (R_2 - R_1)/T \quad (12)$$

then:

$$B = 4VB/C \quad (13)$$

The Doppler chirped waveform time-bandwidth product is:

$$BT = 4\,VBT/C \quad (14)$$

where BT is the time-bandwidth product of the waveform.

For example, let:

$f_1$=1 GHz
$f_2$=4 GHz
T=200 milliseconds
V=100 knots.

then:

b=1 kHz bT=400
BT=88 dB
$fd_1 = 2Vf_1/C + 2BR_1/TC$
$fd_2 = 2Vf_2/C + 2Br_2/TC$

Figure 5:
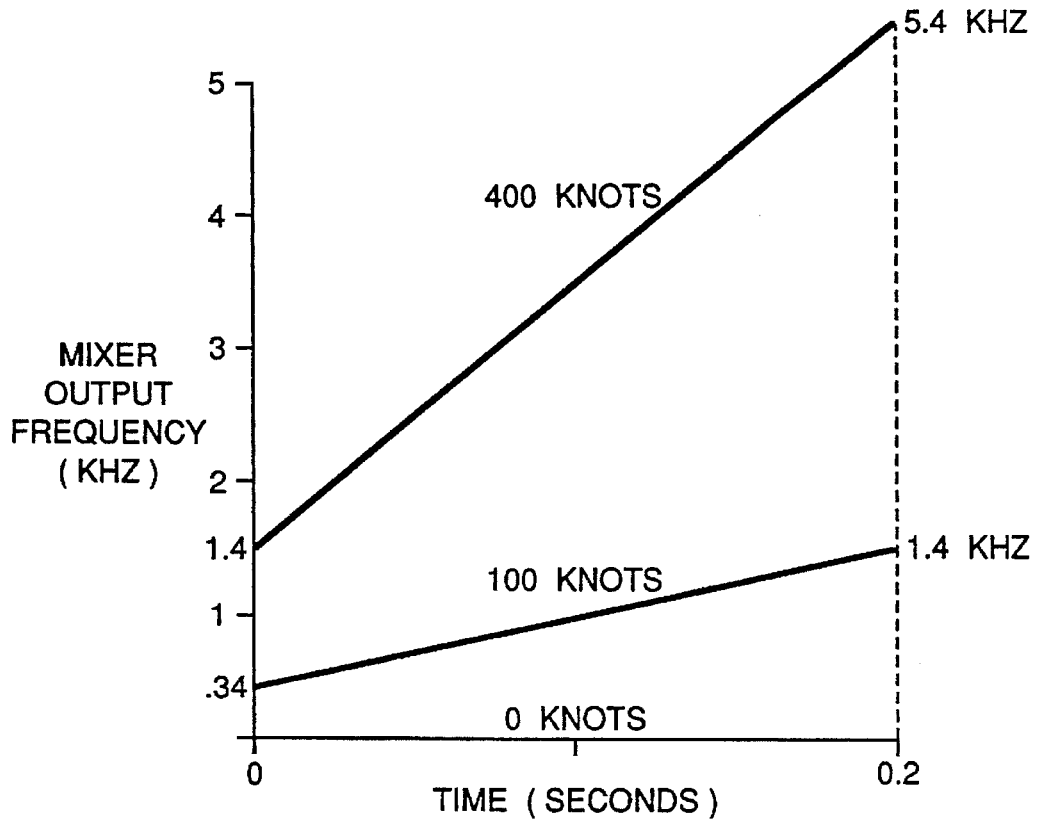
FIG. 5 is a chart displaying the mixer instantaneous frequency vs. time for three targets with velocities of 0,100 and 400 knots, all at zero range.
Figure 6:
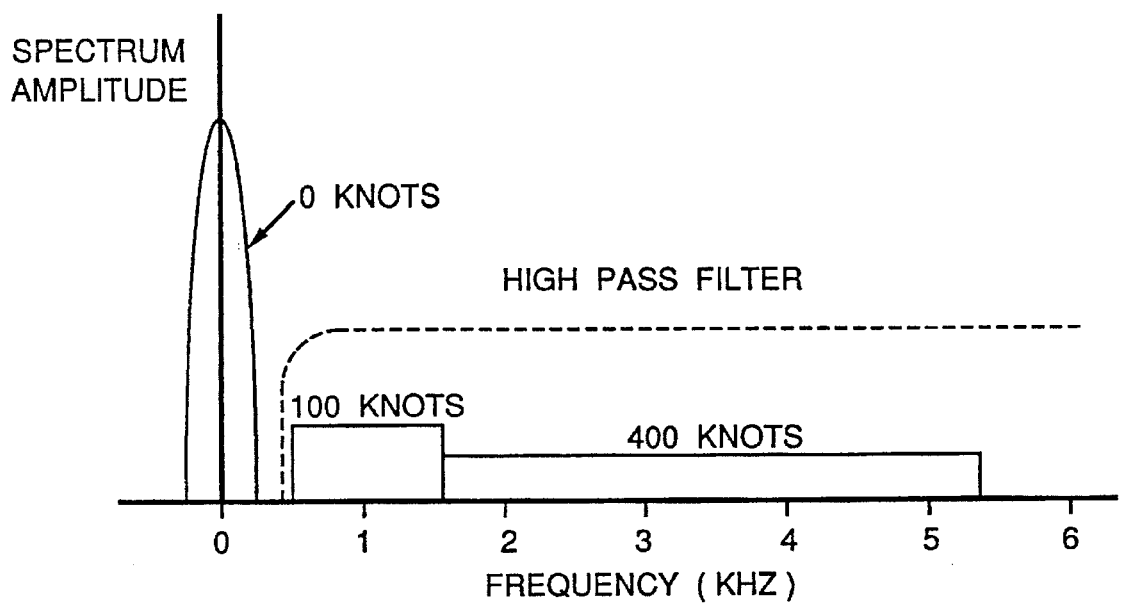
FIG. 6 is a chart displaying the spectrum of the same three targets of FIG. 5.

FIGS. 5 and 6 show some practical numbers for the case in which the transmitted waveform is chirping from 1 GHz to 4 GHz. The three targets are at zero range. For an outgoing target at range R, and velocity V, the instantaneous frequency $f_1$ at the mixer output is:

$$f_1 = 2\ RB/CT + 2VBt/CT \quad (15)$$

The slope of the instantaneous frequency at the mixer output (see FIG. 8, point C), is:

$$df_1/dt = 4\ VB/CT \quad (16)$$

It is important to note that the slope of the curve is proportional to the targets's velocity. Further, the slope equation does not contain any range term and is completely independent of range. Thus, for a single sweep of the chirp waveform, the target's velocity is uniquely and non-ambiguously determined.

Another important feature of this invention is that the signal processing architure is a matched filter receiver, which gives the best possible Signal-to-Noise Ratio. To help in describing the method, an example is given for detecting 100 knot targets as follows.

For example with the parameters:

R=1 mile
$F1_1$=1 GHz
$F_2$=4 GHz
V=100 Knots
T=1 second

Figure 7:
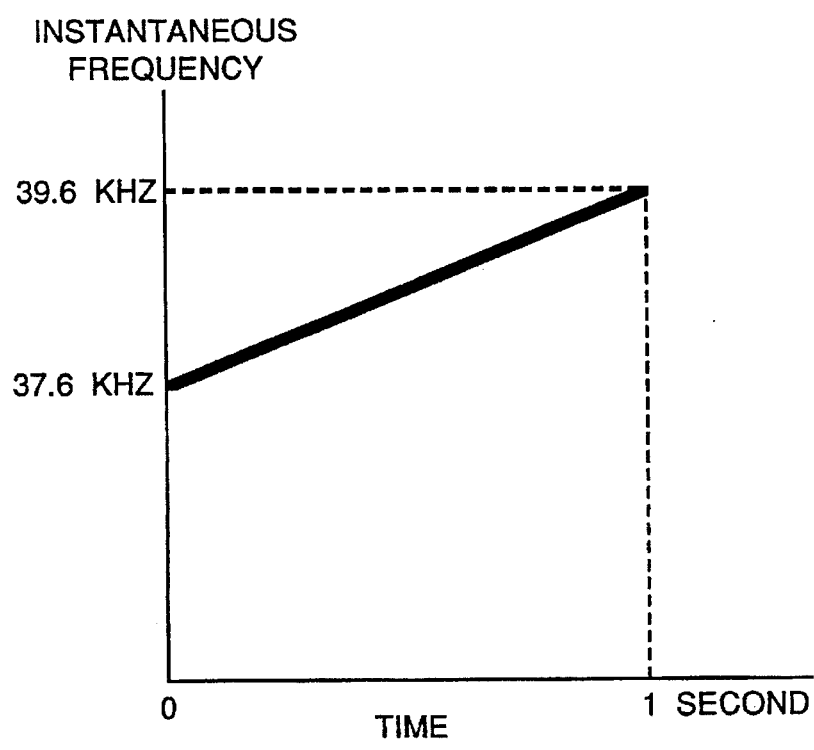
FIG. 7 is a chart of instantaneeous frequency vs. time.

The mixer output is seen in FIG. 7.

The signal processing method described above can be implemented using the ultra-wideband radar system of the above-cited Lee et al. reference. This is accomplished by using the equations in a digital data processor. Another embodiment of the present invention shown in FIG. 8 includes an FM-CW radar with a Doppler chirp compression filter. This radar system includes: a chirp pulse generator 800, a transmitting radar antenna 810, a radar receiving antenna 840 and two mixers 830 and 860 a doppler deramping chirp signal generator 850, and amplitude weighting amplifier 870, and a spectrum analyzer 880.

The chirp pulse genertor 800 is a waveform generator that produces an ultra-wideband chirp pulse pair, which is radiated out through the transmitting antenna 810 to the target 820. A Doppler-shifted chirp pulse is reflected off the target and received by the receiving antenna 840.

The first mixer 830 mixes the ultra-wideband chirp pulse pair (which it receives from the chirp pulse generator) with the Doppler-shifted chirp pulse pair (which is received from the receive antenna) to produce thereby an output signal known as a video beat note. The beat note indicates the range of the target by virtue of the delay between the transmitted pulses and the received pulses.

The second mixer 860 produces an output signal by mixing the video beat note(from the first mixer) with a Doppler deramping chirp (from a signal generator). The output signal of the second mixer is then amplitude weighted by the amplifer 870 to reduce sidelobes, and is sent to the spectrum analyzer 880 for conventional data analysis. The data processor 890 uses the algorithms cited above to determine the target's velocity, range and position. More details on a suitable processor is describe in U.S. patent application Ser. No. 08/100,649 now U.S. Pat. No. 5,351,053 entitled "Ultra Wide-Band Radar Signal Processor for Electronically Scanned Arrays" by Michael C. Wicks et al., Air Force Invention No. 19,271, the disclosure of which is incorporated herein by reference.

Figure 8:
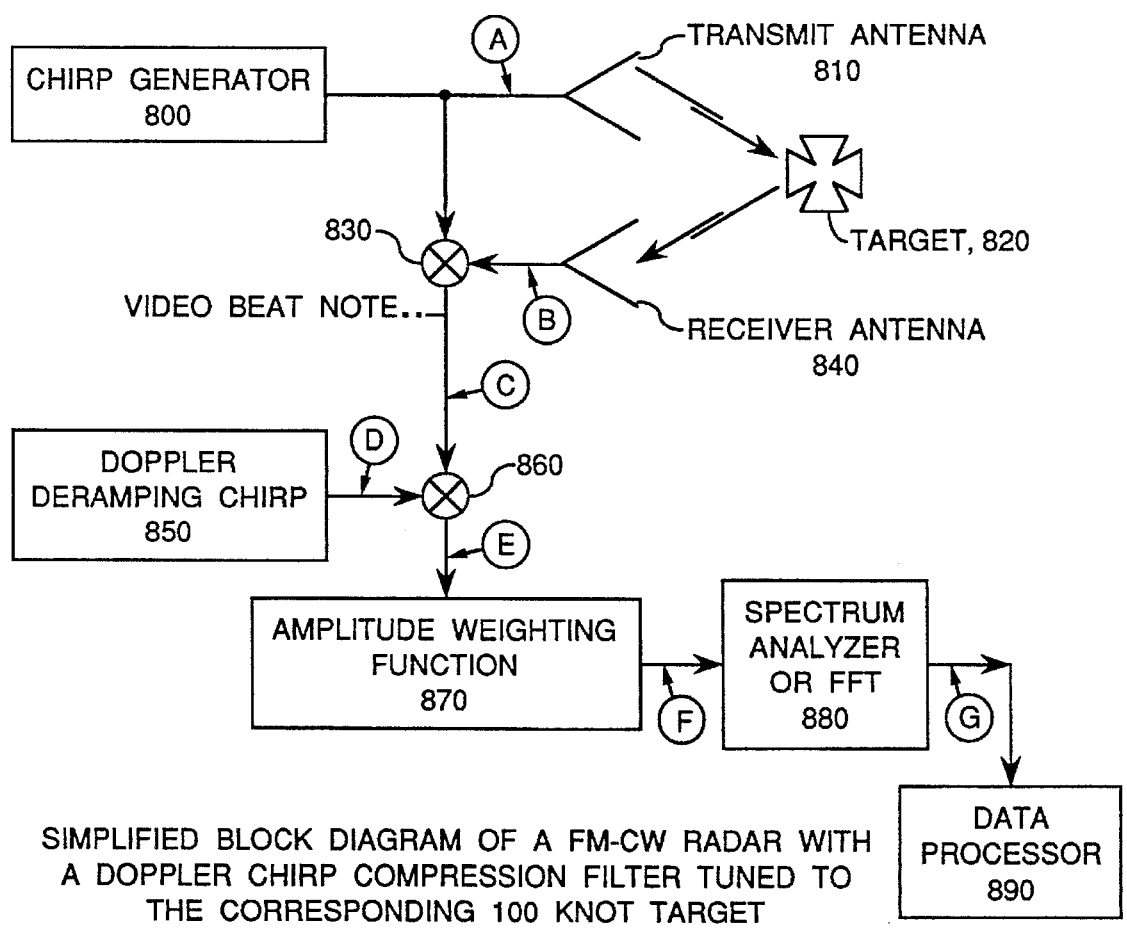
FIG. 8 is block diagram of an FM-CW radar system of the present invention.
Figure 9:
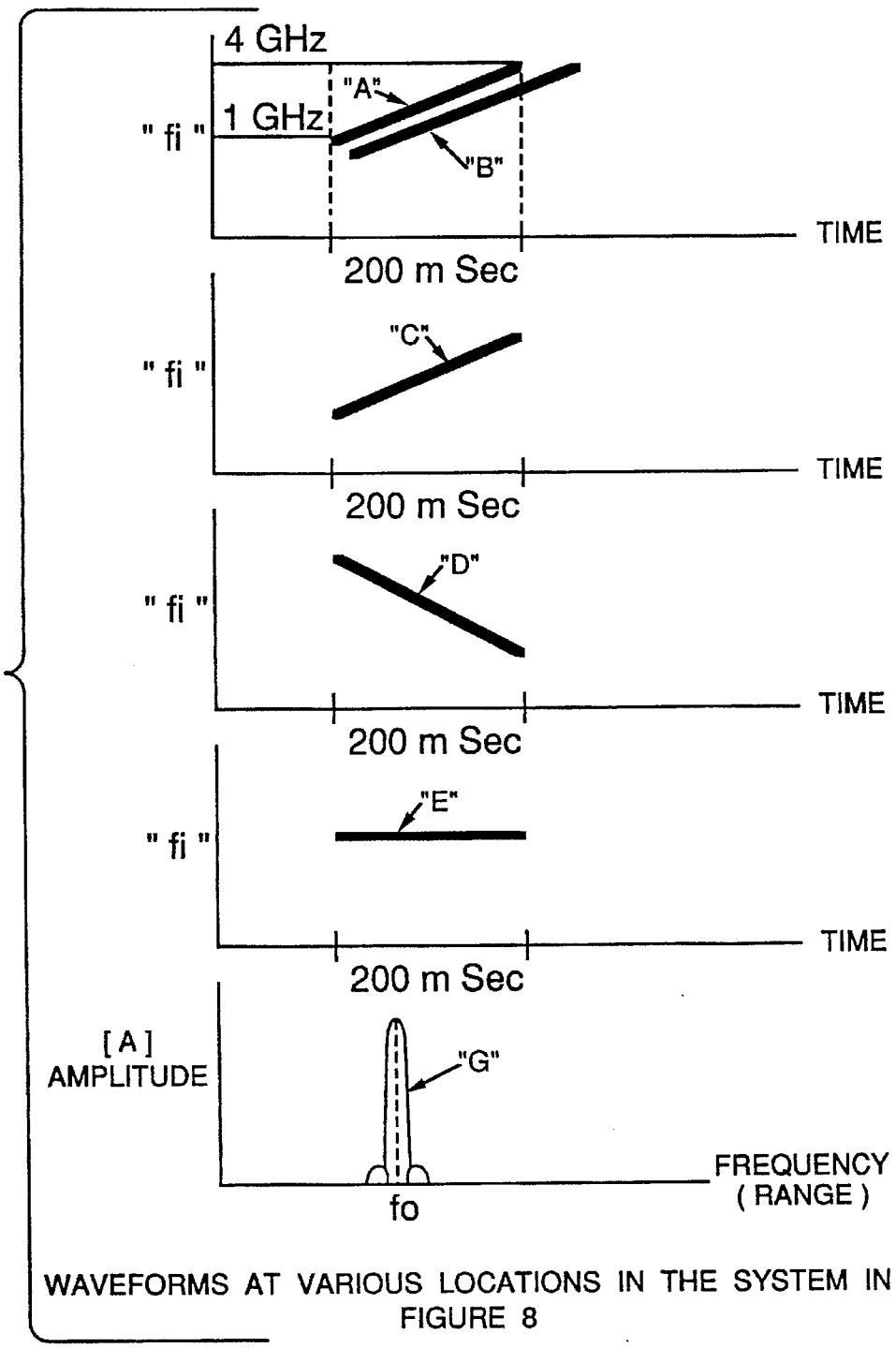
FIG. 9 includes five charts of waveforms at various locations the radar system of FIG. 8.

As shown in FIG. 8, the signal processing consists of mixing the target return with the transmitted waveform, to obtain the video beat note. This signal is mixed with a Doppler deramping chirp waveform which is tuned to the 100 knot target (or any other desired target velocity). The output is amplitude weighted to reduce sidelobes, and the Fast Fourier Transform algorithm is applied. The waveforms at various locations in the system in FIG. 8 are shown in FIG. 9.

Figure 10:
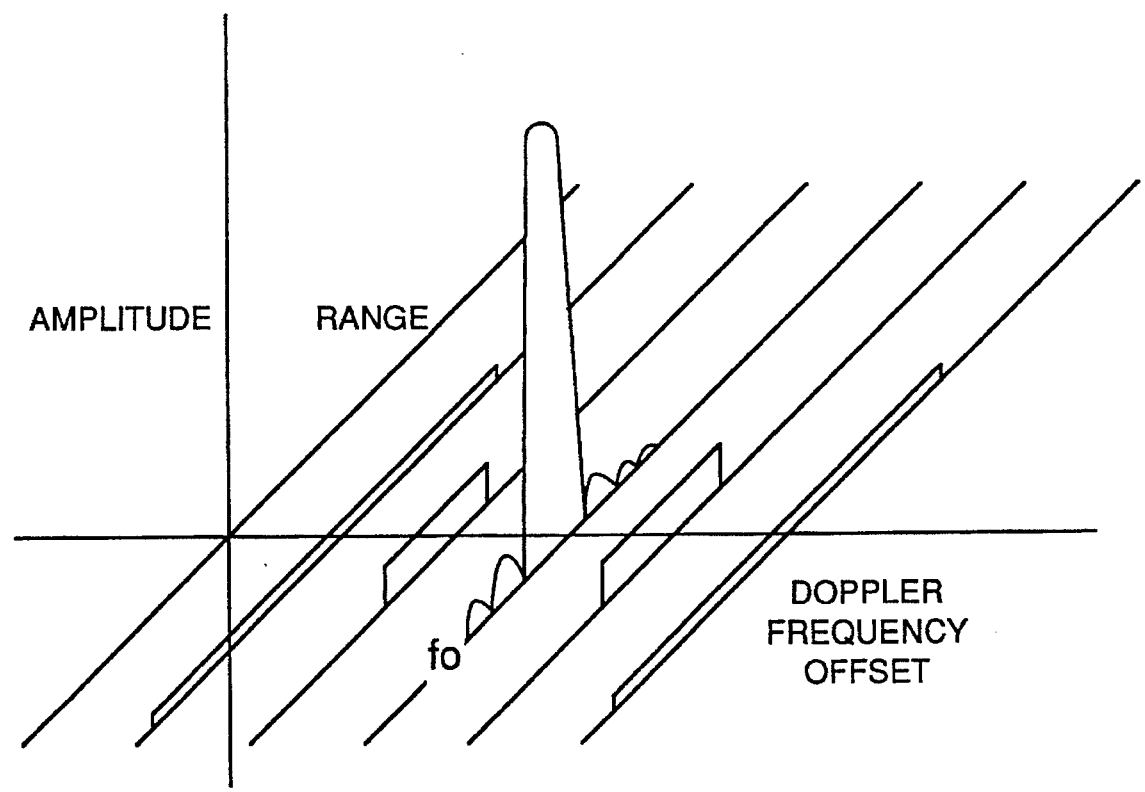
FIG. 10 is a chart of the response of the chirp compression filter which shows the effect of Doppler frequency offset.
Figure 11:
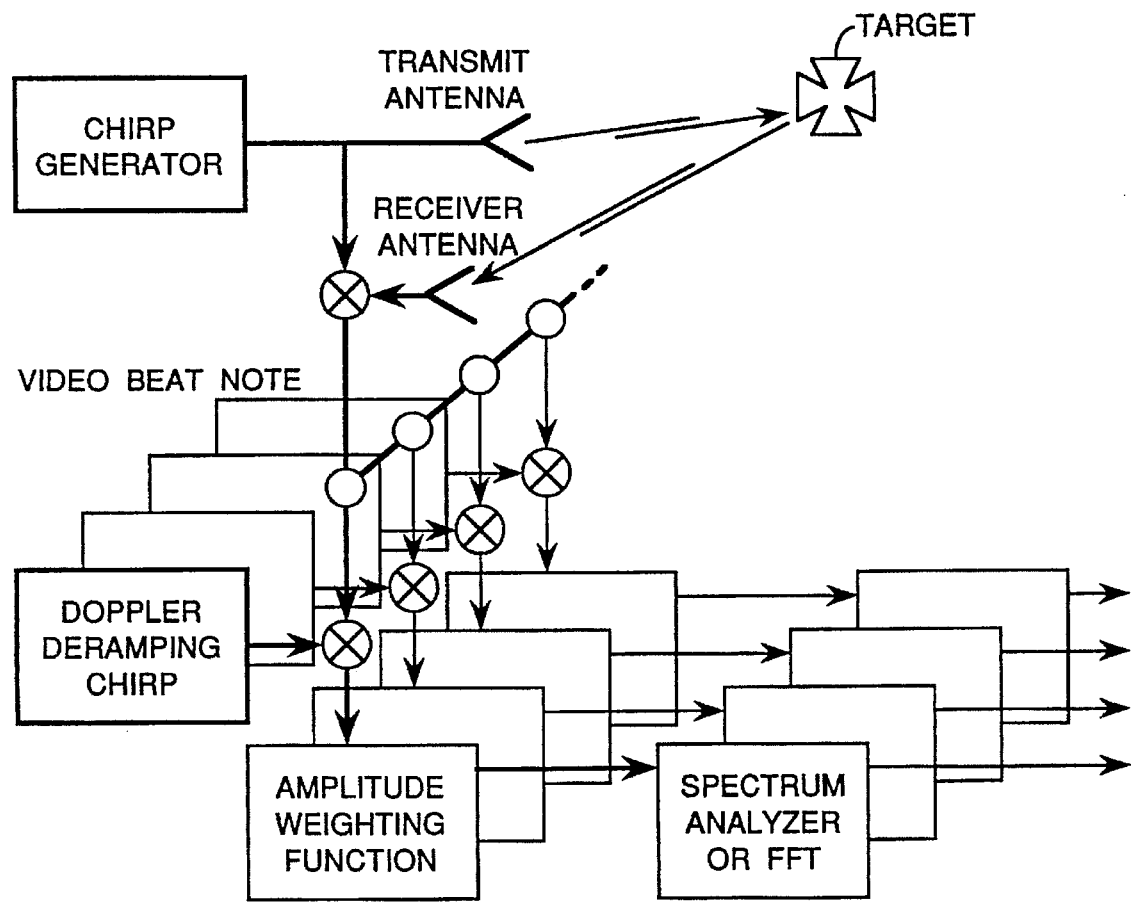
FIG. 11 is a simplified block diagraam of an FM-CW radar with a Doppler filter band.

The response to an off-frequency Doppler target (i.e. any target with velocity other than that used to set the Doppler deramping chirp waveform), is seen in FIG. 10. This response is the result of a mismatched chirp slope passing through the compression filter. A bank of matched filters can be constructed to form a Doppler processor as seen in FIG. 11.

Still another unique feature of this invention is that the method produces time-expansion. This is important because without time expansion, the large bandwidths of the system would make signal processing nearly impossible with present day components. With the last example above of radiating 1 GHz to 4 GHz the 3 GHz bandwidths signal was reduced to 1 kHz bandwidth, making both analog and digital signal processing feasiable with present day components.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A process for use with a radar system for measuring an unambigiuous Range-Doppler measurement of a target's velocity, said process comprising the steps of:

transmitting an ultra-wideband chirped pulse from said radar system;

receiving a Doppler-shifted chirped pulse as a target echo return signal from said target; and determining said target's velocity using both said chirped pulse and said Doppler shifted chirped pulse to determine said measurement thereby.

2. A process, as defined in claim 1 wherein said ultra-wideband chirped pulse spectrum covers the frequency rouge from frequency $f_1$, to frequency $f_2$, and wherein said baseband doppler-shifted chirped pulse spectrum covers its frequency $fd_1$, to frequency $fd_2$, and wherein said detemining step is performed by:

$V = C\ (f_{d2} - f_{d1})/4B$ where:

V is the velocity of the target,

B equals bandwidth given by $f_2 - f_1$; and

C equals the velocity of light.

3. A process, as defined in claim 1, wherein said ultra-wideband chirped waveform comprise a pulse with a frequency sweeping from $f_1$, to frequcy $f_2$, and wherein said baseband Doppler-shifted pulse with a frequency sweeping from $fd_1$ to $fd_2$, and wherein said determining step is performed by mixing said ultra-wideband chirped pulse with said Doppler-shifted chirped pulse to obtain an output signal with an instantaneous frequency f; and wherein said velocity is determined by a mathematical relationship comprising:

$f_i = 2RB/CT + 2VBt/CT$ where:

V equal the velocity of the target;

B equals a bandwidth given by $f_2-f_1$;

C equals the velocity of light;

T equals a time duration of said ultra-wideband chirped pulse pair; and t equals a time delay below reception of the Doppler-shifted chirped pulse.

4. A process, as defined in claim 3, wherein said pulse is taken from a radar frequency band.

5. A process, as defined in claim 2, wherein said pulse has frequencies f1 and f2 which are selected from a radar frequency range which extends from about 300 Mc to 40 Gc such that said second pulse has its frequency $f_2$ greater than the frequency $f_1$ by about 25 percent of said radar frequency range.

6. A process, as defined in claim 4, wherein said first pulse and said second pulse each have frequencies which are selected from a radar frequency range which extends from about 300 Mc to 40 Gc such that said second pulse has its frequency $f_2$ greater than the frequency $f_1$ by about 25 percent of said radar frequency range.

7. A process, as defined in claim 5, wherein said first pulse and said second pulse each have frequencies which are selected from a radar frequency range which extends from about 300 Mc to 40 Gc such that said second pulse has its frequency $f_2$ greater than the frequency $f_1$ by about 25 percent of said radar frequency range.

8. A process, as defined in claim 6, wherein said target is accelerating with an acceleration which has a value A which may be determined by a mathematical relationship comprising:

$dfi/dt = 4VB/CT + 2AB/CT$ where:

dfi/dt is a derivative of the instantaneous frequency with respect to time.

9. A process, as defined in claim 8, wherein said first pulse is taken from a first radar frequency band, and said second pulse is taken from a second radar frequency band.

10. A process, as defined in claim 9, wherein said first pulse and said second pulse each have frequencies which are selected from a radar frequency range which extends from about 300 Mc to 40 Gc such that said second pulse has its frequency $f_2$ greater than the frequency $f_1$ by about 25 percent of said radar frequency range.

11. An ultra-wideband radar system for tracking a moving target, and which comprises:

a means for transmitting an ultra-wideband chirped pulse pair towards said moving target;

a means for receiving a Doppler-shifted chirped pulse pair, said Doppler-shifted chirped pulse pair being a target echo return signal which occurs when said ultra-wideband chirped pulse pair is reflected off of said moving target; and a means for processing signals which receives said Doppler-shifted chirped pulse pair from said receiving means, and measures said moving target's velocity, range and position therefrom.

12. An ultra-wideband radar system, as defined in claim 11, wherein said transmitting means comprises:

a first signal generator which produces an output signal by generating said ultra-wideband chirped pulse pair which comprises a first pulse with a frequency $f_1$, and a second pulse with a frequency $f_2$, and wherein said Doppler-shifted chirped pulse pair has a first Doppler-shifted pulse with a frequency $f_{d1}$, and a second Doppler-shifted pulse with a frequncy $f_d2$;

a transmitting antenna which receives the output signal of said first signal generator and transmits said ultra-wideband chirped pulse pair thereby.

13. An ultra-wideband radar system, as defined in claim 12, wherein said signal processing means comprises:

a data processor which measures said moving target's velocity, range and position using both said ultra-wideband chirped pulse pair and said Doppler shifted chirped pulse pair; and a signal processing circuit which is electrically connected between said transmitting means, said receiving means and said data processor to conduct said ultra-wideband chirped pulse pair and said Doppler-shifted chirped pulse pair to said data processor.

14. An ultra-wideband radar system, as defined in claim 13, wherein said data processor comprises a computer which is programmed to calculate said moving target's velocity using:

$V = C(f_{d2} - f_{d1})/4B$ where:

V equals the velocity of the target;

B equals a bandwidth given by $f_2-f_1$; and

C equals the velocity of light.

15. An ultra-wideband radar system, as defined in claim 14, wherein said signal processing circuit comprises:

a first mixer which produces an output signal by receving and mixing the ultra-wideband chirped pulse pair from the transmitting means, with the Doppler-shifted chirped pulse pair from the receiving means;

a second generator which outputs a Doppler deramping chirp signal;

a second mixer which produces an output signal by receiving and mixing the output signal of the first mixer with the Doppler deramping chirp signal of the second signal generator;

an amplifier which produces output signal by amplitude weighing the output signal of the second mixer;

a spectrum analyzer which produces an output signal to display processed target echo return signals by processing the output signal of the analyzer, and a data processor which determines the velocity of the moving target by a mathematical relationship comprising:

$f_1 = 2Rb/CT + 2VBt/CT$ where:

V equals the velocity of the target;

B equals a bandwidth given by $f_2-f_1$;

C equals the velocity of light;

T equals a time duration of said ultra-wideband chirped pulse pair; and t equals a time delay before reception of the doppler-shifted chirped pulse pair.

16. An ultra-wide radar system, as defined in claim 15, wherein said first pulse is taken from a first radar frequency band, and said second pulse is taken from a second radar frequency band.

17. An ultra wide radar system, as defined in claim 16, wherein said first pulse and said second pulse each have frequencies which are selected from a radar frequency range which extends from about 300 Mc to 40 Gc such that said second pulse has its frequency $f_2$ greater than the frequency $f_1$ by about 25 percent of said radar frequency range.

* * * * *